(12) United States Patent
Ostwald

(10) Patent No.: US 6,362,746 B2
(45) Date of Patent: *Mar. 26, 2002

(54) METHOD AND SYSTEM FOR MONITORING VIBRATION OF ROBOTS IN AN AUTOMATED STORAGE LIBRARY

(75) Inventor: Timothy C. Ostwald, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/818,412

(22) Filed: Mar. 27, 2001

Related U.S. Application Data

(63) Continuation of application No. 09/584,639, filed on May 31, 2000, now Pat. No. 6,265,982.

(51) Int. Cl.$^7$ ............................................. G08B 21/00
(52) U.S. Cl. .................. 340/683; 340/686.2; 340/686.4; 340/825.36
(58) Field of Search ........................... 340/683, 825.36, 340/686.4, 686.2; 360/90, 90.2, 178, 179

(56) References Cited

U.S. PATENT DOCUMENTS 5,488,872 A * 2/1996 McCormick ............. 73/862.68
6,265,982 B1 * 7/2001 Ostwald ..................... 340/683

* cited by examiner

Primary Examiner—Daniel J. Wu
Assistant Examiner—Son Tang
(74) Attorney, Agent, or Firm—Brooks & Kushman P.C.

(57) ABSTRACT

A method and system for the storage and retrieval of media in an automated storage library having media storage cells each housing a single media includes a robotic mechanism. The robotic mechanism is operable to move through the storage library to access the media in the media storage cells. A vibration sensor is associated with the robotic mechanism for generating a vibration signal indicative of vibration of the robotic mechanism. A controller is operable with the vibration sensor for processing the vibration signal to determine if the vibration of the robotic mechanism is abnormal. In the event that the vibration is abnormal, the controller generates a warning signal to warn the operator of the storage library of a possible problem prior to actual failure of the robotic mechanism. The controller is also operable to associated the vibration of the robotic mechanism with particular storage library locations to warn the operator of possible problem locations of the storage library.

23 Claims, 3 Drawing Sheets

METHOD AND SYSTEM FOR MONITORING VIBRATION OF ROBOTS IN AN AUTOMATED STORAGE LIBRARY

CROSS-REFERENCE TO RELATED APPLICATIONS

This is a continuation of co-pending application Ser. No. 09/584,639 filed on May 31, 2000, now U.S. Pat. No. 6,265,982.

TECHNICAL FIELD

The present invention relates generally to robotic mechanisms that manipulate media cartridges in an automated media cartridge storage library system and, more particularly, to a method and system for monitoring vibration of robotic mechanisms in an automated storage library to warn of storage library failure events.

BACKGROUND ART

It is a problem in an automated media cartridge storage library to provide an early warning of failure events such that the failure events can be addressed before they prevent down time of the storage library. Existing automated storage libraries are capable of storing and retrieving large quantities of information stored on media cartridges. This is accomplished by the use of a large number of cartridge storage cells, each of which houses a single media cartridge, that are housed within an enclosure. Such storage libraries use a robotic mechanism or picker to quickly move the media cartridges between their media cartridge storage cells and media cartridge players. For example, to retrieve information that is stored on a selected media cartridge, a robotic mechanism is moved to a location opposite the media cartridge storage cell that houses the selected media cartridge. An end effector of the robotic mechanism then grasps the media cartridge and extracts it from the media cartridge storage cell to a media player where the end effector loads the media cartridge into the media player.

A typical storage library includes tracks laid out throughout the storage library. Robotic mechanisms are mounted to the tracks to move throughout the storage library to access the media cartridges and the media cartridge player. The location of the robotic mechanisms in the storage library may be monitored as they move on the tracks through the storage library. A problem occurs when a robotic mechanism or a portion of the track degrades or fails. For instance, a defective robotic mechanism may not be able to access the media cartridges or move through the storage library. A defective robotic mechanism unable to move and stuck on a track may impede movement of other robotic mechanisms along the track. A robotic mechanism may not be able to traverse a defective track portion and consequently be unable to reach a selected media cartridge or media cartridge player.

Robotic mechanisms mounted on tracks use rotatable components such as wheels to move along the tracks and other movable components such as an end effector for moving the media cartridges in and out of the storage cells. During operation the components of the robotic mechanisms have vibration characteristics and other parameters associated with their movements. When the robotic mechanisms are operating properly the vibration characteristics match known vibration characteristics indicative of proper operation. When the robotic mechanisms are not operating properly due to such factors as wear, misuse, accidental damages, and the like the vibration characteristics differ from the known vibration characteristics. Properly operating robotic mechanisms also exhibit different vibration characteristics when moving over defective tracks. As the robotic mechanisms start to degrade the vibration characteristics start to change. The change of the vibration characteristics is a flag and a warning indicative of robotic mechanisms problems. These problems can be addressed before they become bigger problems, such as robotic mechanism failure, by monitoring the vibration characteristics of the robotic mechanisms to become aware of the warnings and act on them.

SUMMARY OF THE INVENTION

Accordingly, it is an object of the present invention to provide a method and system for monitoring robotic mechanism vibration in an automated storage library to warn of storage library failure events.

It is another object of the present invention to provide a method and system for monitoring robotic mechanism vibration in an automated storage library to detect robotic mechanism degradation or failure.

It is a further object of the present invention to provide a method and system for comparing robotic mechanism vibration characteristics in an automated storage library to known robotic mechanism vibration characteristics indicative of proper operation to detect robotic mechanism degradation or failure.

It is still another object of the present invention to provide a method and system for monitoring robotic mechanism vibration of a robotic mechanism moving on a track throughout an automated storage library to detect track degradation or failure.

It is still a further object of the present invention to provide a method and system for monitoring robotic mechanism vibration in an automated storage library to perform selected diagnostic routines in response to certain robotic mechanism vibration characteristics.

In carrying out the above objects and other objects, the present invention provides an automated storage library having a plurality of media storage cells each housing a single media. A robotic mechanism is operable to move to access the media in the media storage cells. A vibration sensor is associated with the robotic mechanism for generating a vibration signal indicative of vibration of the robotic mechanism. A controller may be operable with the vibration sensor for processing the vibration signal to determine if the vibration of the robotic mechanism is abnormal.

In carrying out the above objects and other objects, the present invention further provides a method for operating an automated storage library having a plurality of media storage cells each housing a single media. The method includes moving a robotic mechanism to access the media in the media cells. Vibration of the robotic mechanism is then monitored. A vibration signal indicative of the vibration of the robotic mechanism is then generated. The vibration signal may then be processed to determine if the vibration of the robotic pod is abnormal.

The advantages associated with the present invention are numerous. The method and system of the present invention sense mechanical vibrations in a robot assembly and correlate the sensory data to a normal data pattern to provide an early warning of impending failure. By placing a vibration sensor (accelerometer) on board a moving robotic assembly, and using the electrical output of the vibration sensor to feed a logic circuit, a system of checks against known parameters of the robotic pod and the storage library could be used to gauge whether the mechanics are running smoothly.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
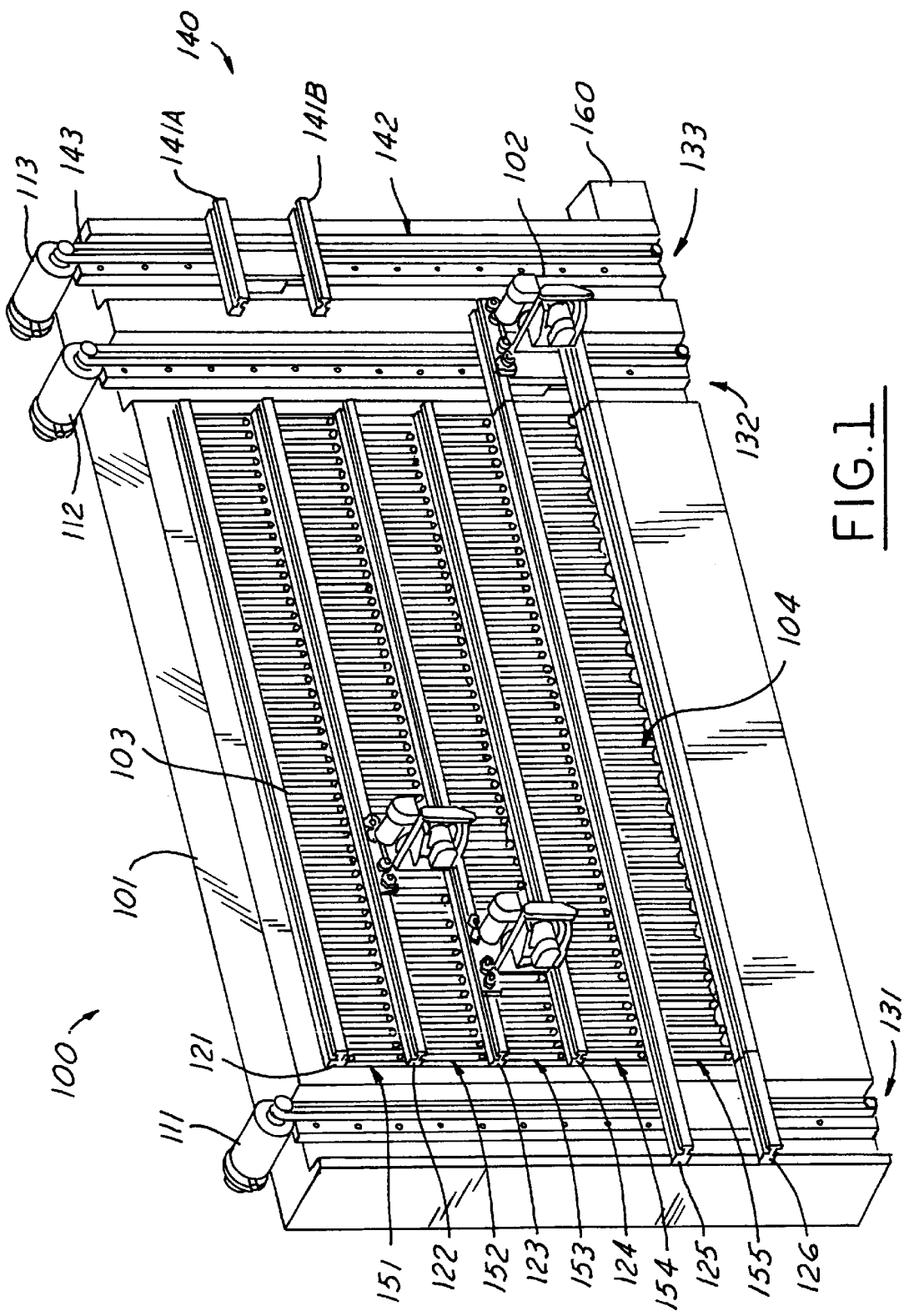
FIG. 1 illustrates a perspective view of an automated library system in accordance with the present invention.

Referring now to FIG. 1, an automated storage library 100 for use with the present invention is shown. Storage library 100 includes multiple independent robotic mechanisms (robotic pods) 102 to enable library system 100 to concurrently manipulate multiple media cartridges 105. Storage library 100 includes a two-dimensional vertical standing array of media cartridge storage cells 103 and media cartridge players 104 that are mounted in a frame 101. A system of tracks or rails 121–126 is used to guide robotic pods 102 through all of the locations in the array. Robotic pods 102 contain a movable carriage that is capable of transporting robotic components, such as media cartridge pickers, bar code reading devices, and other task oriented sub-modules on tracks 121–126 of storage library 100.

Frame 101 is designed to receive a plurality of rows 151–155 of media cartridge storage cells 103 each of which is designed to house a single media cartridge 105. Media cartridge players 104 are shown in an arbitrary location in a horizontal row 155 at the bottom of frame 101, although storage library 100 can incorporate media cartridge players 104 at any location in frame 101 to optimize performance. Robotic pods 102 are attached to frame 101 via horizontal guide tracks or rails 121–126 which serve to frame media cartridge storage cells 103 and media cartridge players 104 on the top and bottom sides thereof. Storage library 100 includes an array of media storage cells 103 fully populated with media cartridges 105 of any arbitrary type. Robotic pod tracks 121–126 provide support of robotic pods 102 in the vertical direction to oppose the force of gravity, and they also provide a meshing surface of a suitable design to impart traction in the horizontal direction for motive transport of the robotic pods. Robotic pods 102 each incorporate a drive means for propulsion in the horizontal direction along guide tracks 121–126.

Storage library 100 further includes vertical elevator assemblies 131–133 that enable the transfer of robotic pods 102 in the vertical direction. Each of vertical assemblies includes a set of vertical rails 142 that extend substantially from the top of frame 101 to the bottom of the frame. Vertical rails 142 support elevator stations 140 each of which contain short horizontal track segments 141A, 141B that are identical in cross section to the main horizontal guide tracks 121–126. Elevator stations 140 are held in suspension by drive belts 143 which wrap around a respective drive pulley attached to a respective vertical drive motor 111–113. When a vertical displacement is required of any robotic pod 102, vertical elevator 140 is scheduled to move in alignment to the appropriate level of rows 151–155 to allow transfer of the robotic pod onto the elevator track segments 141A, 141B from the pair of horizontal tracks 121–126 that are juxtaposed and abutting to elevator track segments 141A, 141B. Once robotic pod 102 is located on elevator station 140, drive motor 113 is activated to transport robotic pod 102 to a selected one of rows 151–155 and thence moves on to the pair of horizontal tracks 121–126 that correspond to the selected row.

A storage library control unit (controller) 160 provides commands to robotic pods 102 and elevator stations 140 to manipulate media cartridges 105. Controller 160 communicates with each robotic pod 102 individually by radio frequency communication links, infrared communication links, or other wireless links. Wired communication links may be use if only a few robotic pods 102 are used in storage library 100 and their paths are simple to keep the wires from becoming entangled with each other. Commands to robotic pods 102 include movement along tracks 121–126, movement of media cartridges 105 into and out of the robotic pods, reading bar codes on the media cartridges, and the like.

Controller 160 and robotic pods 102 are operable with one another such that the controller knows the position of the robotic pods within storage library 100 as they move about tracks 121–126. This is accomplished by mounting position sensors on robotic pods 102 which provide information regarding the position of the robotic pods to controller 160. This may also be accomplished by providing sensors on tracks 121–126 which are actuated to transmit a signal to controller 160 when a robotic pod 102 traverses a sensor on tracks 121–126. This may further be accomplished by having robotic pods 102 provide information regarding the speed and direction of their travels through storage library 100.

Communications between controller 160 and elevator motors 111–113 is typically provided by direct wiring. Commands from controller 160 to each of elevator motors 111–113 include at least moving elevators 140 up and down and holding the elevators in position. Each elevator motor 111–113 is controlled independently of the other elevator motors.

Controller 160 may also be in communication with media cartridge players 104. In one embodiment, controller 160 provides commands to mount and dismount media cartridges 105 into and out of media cartridge players 104. Controller 160 coordinates these commands with positioning commands to a robotic pod 102 that supplies or receives a media cartridge 105 to and from a media cartridge player 104. In another embodiment, an external source (not shown) provides the mount and dismount commands directly to media cartridge players 104. Here, controller 160 coordinates with the external source to position the proper robotic pod 102 adjacent media cartridge player 104 prior to the mount or dismount command being given to the media cartridge player.

Figure 2:
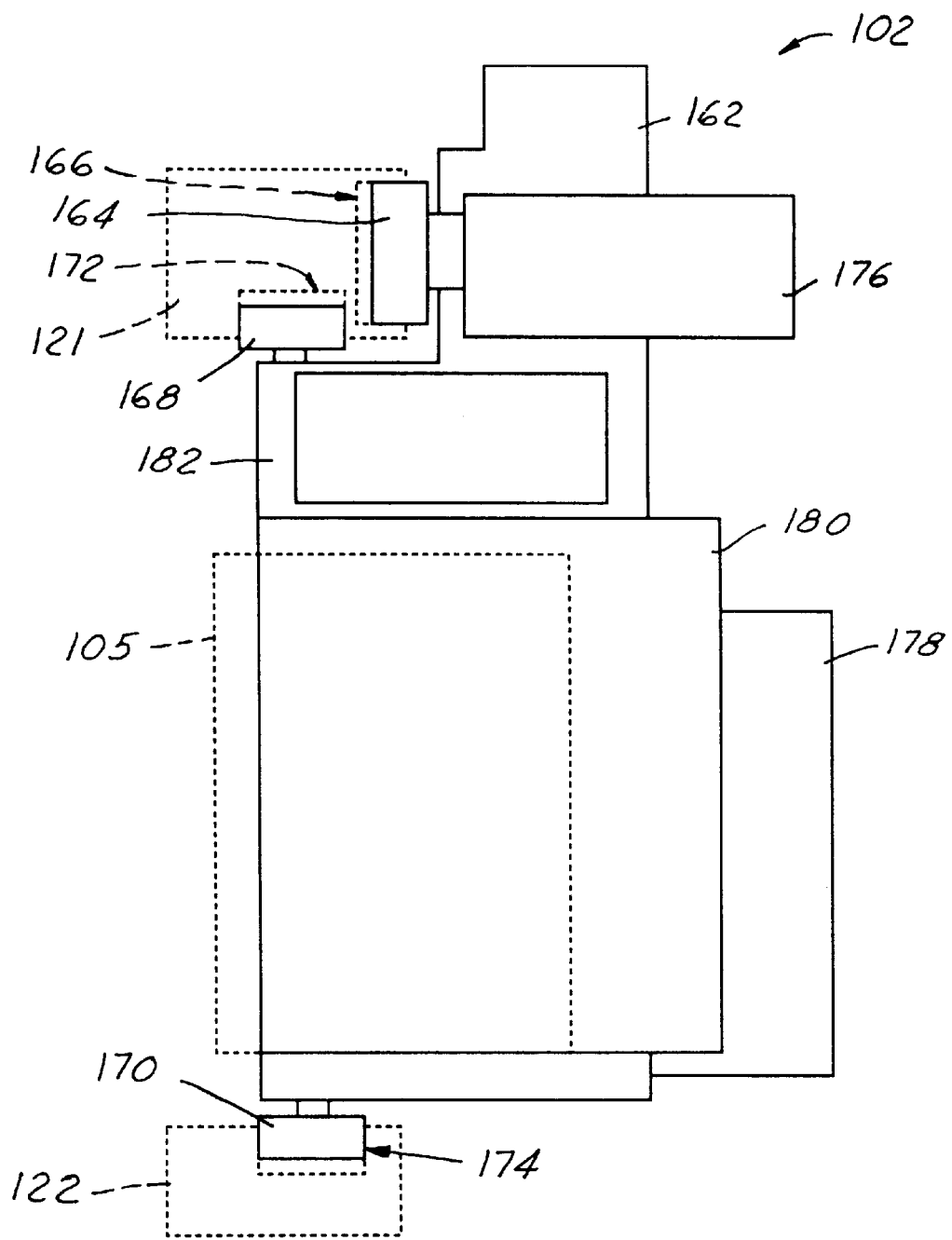
FIG. 2 illustrates a side view of a robotic pod of the automated library system in accordance with the present invention.

Referring now to FIG. 2, a side view of a robotic pod 102 supported on an upper track 121 and a lower track 122 (both shown in phantom) is shown. Robotic pod 102 has a frame 162 for structural support. Frame 162 is suspended from upper track 121 by multiple main drive wheels 164 that ride in a main groove 166 provided in upper track 121. Additional wheels 168 and 170 are rotatably mounted in frame 162. These additional wheels 168 and 170 move in additional grooves 172 and 174 provided in upper track 121 and lower track 122 respectively. The additional wheels 172 and 174 help orient robotic pod 102 with respect to media cartridge storage cells 103 and media cartridge players 104.

Main drive wheels 164 are coupled to a drive mechanism 176. Drive mechanism 176 rotates main drive wheels 164 to cause robotic pod 102 to move along tracks 121–122. An electronics circuit 178 coupled to drive mechanism 176 provides control over the speed and direction of main drive wheels 164. Electronics circuit 178 is operable to communicate with controller 160 for controlling robotic pod 102 and providing information regarding the robotic pod to the controller.

Robotic pod 102 further includes a gripper mechanism 180. Gripper mechanism 180 is operable to move to an extended position to grasp a media cartridge 105 and to move back to a retracted position to pull the media cartridge into robotic pod 102 to enable transportation of the selected media cartridge to a designated location by the movement of the robotic pod.

In accordance with the present invention, robotic pod 102 further includes a vibration sensor 182 for sensing mechanical vibration of the robotic pod during its operation. Vibration sensor 182 is preferably an accelerometer or the like operable with electronics circuit 178 for communicating with controller 160. Vibration sensor 182 is operable to sense vibration associated with rotation of main wheels 164 and support wheels 168 and 170, vibration associated with operation of drive mechanism 176, vibration associated with operation of gripper mechanism 180, and the like. Vibration sensor 182 is capable of sensing vibration amplitude and frequency and vibration patterns and combinations thereof.

Figure 3:
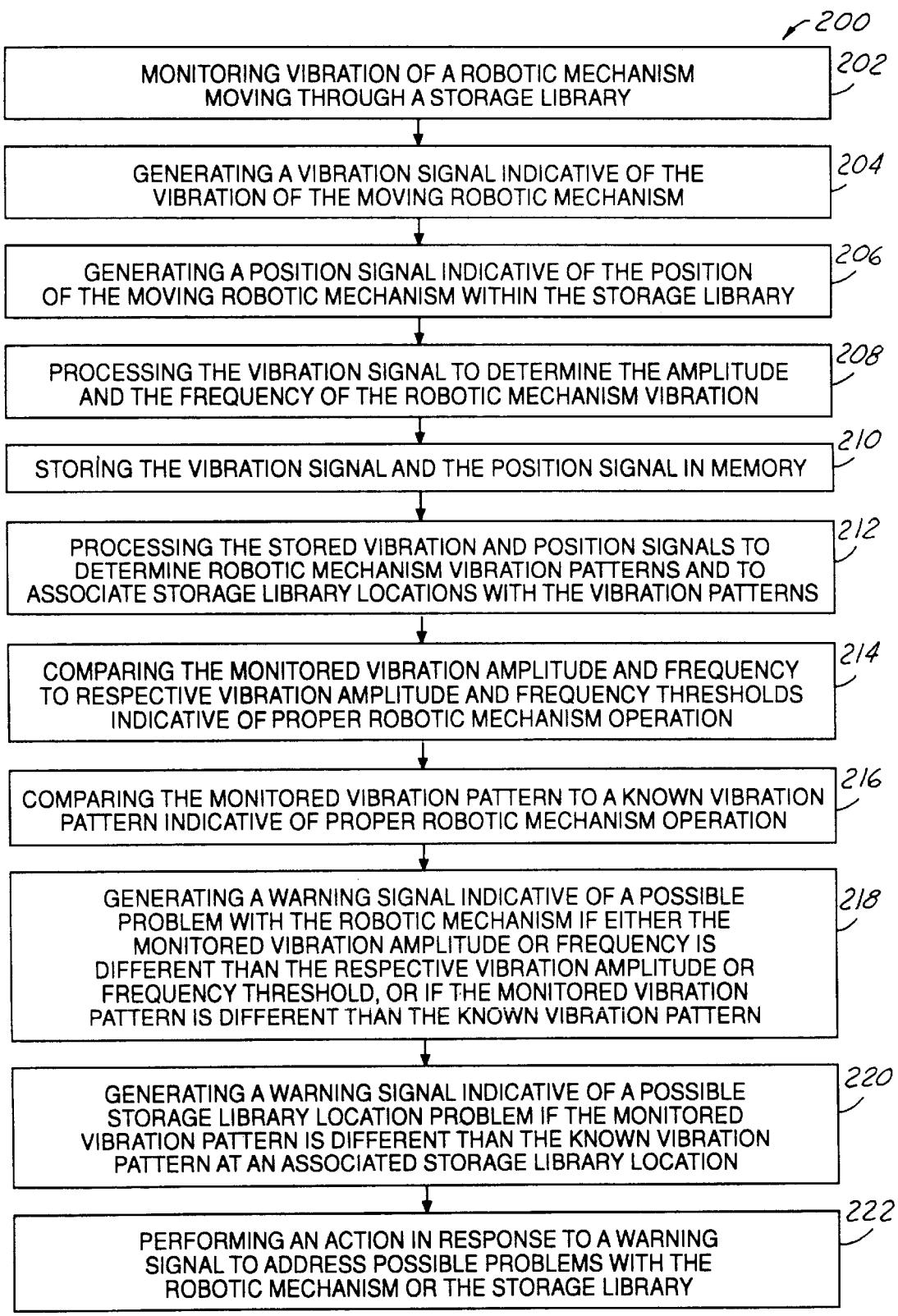
FIG. 3 illustrates a flow chart describing operation of the method and system of the present invention.

Referring now to FIG. 3, a flowchart 200 describing operation of the method and system for monitoring vibration of robotic pods in an automated storage library to warn of storage library failure events in accordance with the present invention is shown. Vibration sensor 182 monitors vibration of robotic pod 102 as the robotic pod moves through storage library 100 as shown in block 202. Vibration sensor 182 may also monitor vibration of robotic pod 102 as it interacts with media cartridges 104 as described above. Vibration sensor 182 generates a vibration signal indicative of vibration of robotic pod 102 as the robotic moves or operates as shown in block 204. Vibration sensor 182 provides the vibration signal to electronics circuit 178 which forwards the vibration signal to controller 160. A position signal indicative of the position of robotic pod 102 is also generated in one of the manners described above as the robotic pod moves through storage library 100 as shown in block 206. The position signal is also forwarded to controller 160.

Controller 160 processes the vibration signal to determine the amplitude and the frequency of the vibration of robotic pod 102 as shown in block 208. Controller 160 also stores the vibration signal and the position signal in a memory as shown in block 210. Controller 160 then processes the stored vibration and position signals to determine vibration patterns of robotic pod 102 and to associate storage library locations with the vibration patterns as shown in block 212. Controller 160 then compares the monitored vibration amplitude and frequency to respective vibration amplitude and frequency thresholds with control logic as shown in block 214. The vibration and amplitude frequency thresholds define a border between proper and improper operation of robotic pod 102. For instance, if the monitored vibration amplitude is larger than the threshold vibration amplitude then robotic pod 102 is operating improperly. Likewise, if the monitored frequency falls outside of a suspect frequency range then robotic pod 102 is acting properly. Controller 160 then compares the monitored vibration pattern to a known vibration pattern as shown in block 216. The known vibration pattern is indicative of proper or improper operation of robotic pod 102.

Controller 160 then generates a warning signal if the monitored vibration amplitude or frequency is different than the respective threshold vibration amplitude or frequency as shown in block 218. The warning signal is indicative of a possible problem with robotic pod 102. Controller 160 also generates a warning signal indicative of improper robotic pod 102 operation if the monitored vibration pattern is different than the known vibration pattern.

Controller 160 generates a warning signal of a possible problem with a particular storage library location if the monitored vibration pattern is different than the known vibration pattern at an associated storage library location as shown in block 220. Controller 160 may also generate a warning signal indicative of a possible problem with a particular storage library location if the monitored vibration of robotic pod 102 is different at the particular storage library location when compared to the monitored vibration of the robotic pod at other comparable storage library locations. Robotic pod 102 may have a different vibration pattern at an associated storage library location because the storage library is functioning improperly at the associated location. For instance, a segment of track 121 of storage library 100 may not be working properly. Similarly, a media cartridge player 104 or an elevator 140 may not be functioning properly. The warning signals generated by controller 160 may differ as a function of the severity of the possible problem or the deviance of the measured vibration characteristic with a desired vibration characteristic.

In response to a warning signal, controller 160 causes an action to be performed to address possible problems with robotic pod 102 or storage library 100. The action may include performing a selected diagnostic routine in response to a particular type of warning signal or as a function of the severity of the warning signal. The action may also include generating an alarm to notify a storage library operator of possible problems. The method and system of the present invention is particularly useful in a storage library 100 having multiple robotic pods 102 as controller 160 sorts out the vibration of the various robotic pods. Furthermore, in track mounted storage library 100 vibration sensors 182 mounted on robotic pods 102 provide exact information on which part of which robotic pod or which segment of tracks 121–126 is out of shape. Failure of a wheel or a track segment is highly undesirable and controller 160 is operable to pick out various vibration frequencies (and amplitudes) associated with operation of robotic pod 102 to notify the storage library operator that the wheels or track segments need to be replaced before failure actually occurred.

It is to be appreciated that the robotic mechanism and the storage library configuration described herein are merely examples of a preferred embodiment of the present invention. Other types of storage library configurations may be employed such as a cylindrical storage library configuration. Other types of robotic mechanisms may be employed such as a rotatable robotic arm.

Thus it is apparent that there has been provided, in accordance with the present invention, a method and system for monitoring vibration of robots in an automated storage library to warn of storage library failure events that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library having a plurality of media storage cells each housing a media, the storage library comprising:

a robotic mechanism operable to move to access the media in the media storage cells; and a vibration sensor associated with the robotic mechanism for generating a vibration signal indicative of vibration of the robotic mechanism.

2. The storage library of claim 1 further comprising:

a controller operable with the vibration sensor for processing the vibration signal to determine vibration of the robotic mechanism.

3. The storage library of claim 2 wherein:

the controller is further operable to generate a warning signal indicative of improper operation of the robotic mechanism if the vibration of the robotic mechanism is abnormal.

4. The storage library of claim 2 wherein:

the controller compares the generated vibration signal to a known vibration signal indicative of normal operation of the robotic mechanism to determine if operation of the robotic mechanism is abnormal.

5. The storage library of claim 2 wherein:

the controller compares the generated vibration signal to a threshold signal to determine if operation of the robotic mechanism is abnormal.

6. The storage library of claim 2 wherein:

the controller is operable with the robotic mechanism to know the location of the robotic mechanism as the robotic mechanism moves, wherein the controller associates the vibration signal with the location of the robotic mechanism to determine if the vibration of the robotic mechanism is abnormal at a particular location.

7. The storage library of claim 1 wherein:

the robotic mechanism is a robotic pod operable to move on tracks to access the media in the media storage cells.

8. The storage library of claim 7 wherein:

the robotic pod includes wheels for rotating on tracks to move the robotic pod to access the media in the media storage cells, wherein the vibration sensor generates a vibration signal indicative of vibration associated with rotation of the wheels on the tracks.

9. The storage library of claim 7 wherein:

the robotic pod includes a drive mechanism for propelling the robotic pod to move the robotic pod to access the media in the media storage cells, wherein the vibration sensor generates a vibration signal indicative of vibration associated with propulsion of the drive mechanism.

10. The storage library of claim 1 wherein:

the robotic mechanism includes a gripper mechanism for gripping the media in the media storage cells, wherein the vibration sensor generates a vibration signal indicative of vibration associated with gripping of the media.

11. The storage library of claim 1 wherein:

the vibration sensor is an accelerometer mounted to the robotic mechanism.

12. A storage library comprising:

a plurality of media storage cells each housing a media;

tracks disposed adjacent to the media storage cells for enabling access to each of the media storage cells; and a robotic pod operable to move on the tracks to access the media in the media storage cells; and a vibration sensor associated with the robotic pod for generating a vibration signal indicative of vibration of the robotic pod.

13. The storage library of claim 12 wherein:

the robotic pod includes wheels for rotating on the tracks, wherein the vibration sensor generates a vibration signal indicative of vibration associated with rotation of the wheels on the tracks.

14. The storage library of claim 12 further comprising:

a controller operable with the vibration sensor for processing the vibration signal to determine vibration of the robotic pod.

15. The storage library of claim 14 wherein:

the controller is further operable to generate a warning signal indicative of improper operation of the robotic pod if the vibration of the robotic pod is abnormal.

16. The storage library of claim 14 wherein:

the controller compares the generated vibration signal to a known vibration signal indicative of normal operation of the robotic pod to determine if operation of the robotic pod is abnormal.

17. The storage library of claim 14 wherein:

the controller is operable with the robotic pod to know the location of the robotic pod as the robotic pod moves, wherein the controller associates the vibration signal with the location of the robotic pod to determine if the vibration of the robotic pod is abnormal at a particular location.

18. A method for operating an automated storage library having a plurality of media storage cells each housing a media, the method comprising:

moving a robotic mechanism to access the media in the media cells;

monitoring vibration of the robotic mechanism; and generating a vibration signal indicative of the vibration of the robotic mechanism.

19. The method of claim 18 further comprising:

processing the generated vibration signal to determine vibration of the robotic mechanism.

20. The method of claim 19 further comprising:

generating a warning signal indicative of improper operation of the robotic pod if the vibration of the robotic mechanism is abnormal.

21. The method of claim 19 wherein:

processing the generated vibration signal includes comparing the generated vibration signal to a known vibration signal indicative of normal operation of the robotic mechanism to determine if operation of the robotic mechanism is abnormal.

22. The method of claim 19 wherein:

processing the generated vibration signal includes comparing the generated vibration signal to a threshold signal to determine if operation of the robotic mechanism is abnormal.

23. The method of claim 18 further comprising:

monitoring the location of the robotic mechanism as the robotic mechanism moves; and associating the generated vibration signal with the location of the robotic mechanism to determine if the vibration of the robotic mechanism is abnormal at a particular location.

* * * * *